(12) United States Patent
Peng

(10) Patent No.: US 6,879,920 B2
(45) Date of Patent: Apr. 12, 2005

(54) METHOD AND SYSTEM FOR ESTIMATING MOVEMENT SPEED OF MOBILE UNIT

(75) Inventor: Bao-Chi Peng, Taipei (TW)

(73) Assignee: BenQ Corporation, Taoyuan (TW)

( * ) Notice: Subject to any disclaimer, the term of this patent is extended or adjusted under 35 U.S.C. 154(b) by 1 day.

(21) Appl. No.: 10/616,416

(22) Filed: Jul. 9, 2003

(65) Prior Publication Data

US 2004/0019454 A1 Jan. 29, 2004

(30) Foreign Application Priority Data

Jul. 25, 2002 (TW) .......................... 91116625 A

(51) Int. Cl.$^7$ ................................. H04B 7/00
(52) U.S. Cl. ................ 702/96; 455/238.1; 455/441; 342/461; 342/450
(58) Field of Search ................ 702/96, 142, 127; 375/346, 148, 130, 341, 349; 455/441, 436, 238.1, 67.1, 456.1; 370/335, 342, 345; 342/461, 450; 324/160, 166, 76.55, 76.56, 76.69

(56) References Cited

U.S. PATENT DOCUMENTS

| | | | | | |
|---|---|---|---|---|---|
| 5,282,222 | A | * | 1/1994 | Fattouche et al. | 375/260 |
| 5,748,677 | A | * | 5/1998 | Kumar | 375/285 |
| 5,825,807 | A | * | 10/1998 | Kumar | 375/130 |
| 6,529,850 | B2 | * | 3/2003 | Wilborn et al. | 702/142 |

* cited by examiner

Primary Examiner—John Barlow
Assistant Examiner—Hien Vo
(74) Attorney, Agent, or Firm—Snell & Wilmer L.L.P.

(57) ABSTRACT

The present invention is related to a method for estimating a movement speed of a mobile unit in a mobile radio communication system. First, the present invention receives a first signal from the mobile unit. Then, the system calculates an envelope of the first signal and obtains a second signal by squaring the envelope. Next, the system obtains a third signal by multiplying the second signal by a modulated carrier, the carrier including a carrier frequency. According to the third signal, the present invention estimates the movement speed of the mobile unit.

9 Claims, 8 Drawing Sheets

METHOD AND SYSTEM FOR ESTIMATING MOVEMENT SPEED OF MOBILE UNIT

CROSS REFERENCE TO RELATED APPLICATIONS

This Application claims priority to Taiwan Patent Application No. 091116625 entitled "Method and System for Estimating Movement Speed of Mobile Unit", filed Jul. 25, 2002.

FIELD OF INVENTION

The present invention relates to a method and system for estimating movement speed of mobile unit, and more particularly, to a method and system for estimating movement speed of mobile unit by using a modulated carrier to shift a signal spectrum.

BACKGROUND OF THE INVENTION

In a mobile radio communications system, information is exchanged between mobile unit and base station by radio signals. Since each base station can communicate with a mobile unit only within its radio coverage (cell), there are typically many base stations within a service area. And to avoid interruption when the mobile unit moves from one cell to another cell (roaming), a method is required to enable non-interrupted communication. This is achieved through the handover technology of the communication.

Methods of implementing handover of a call to or from a mobile unit between cells in a mobile radio communication system affect the overall efficiency and the quality of the service. Therefore, it is important to achieve a fast and reliable handover between cells.

Generally, the mobile unit speed is an important factor to determine whether it is worthwhile implementing handover of a mobile unit between cells. The assessment of vehicle speed can be carried out by measuring directly. However this method is not suitable to cellular radio applications. As an alternative, the vehicle speed may be estimated by monitoring the Doppler shift of a carrier frequency. FIG. 1 shows the conventional method for estimating movement speed of a mobile unit. First, a signal from the mobile unit is obtained in step 101. An envelope of the signal is calculated and the envelope is squared in step 103. According to the result of step 103, a correlation coefficient is calculated in step 105. Then, the method obtains a corresponding Doppler frequency by referring to a corresponding relationship between correlation coefficient and Doppler frequency in step 107. Lastly, the method estimates the movement speed of mobile unit according to the Doppler frequency in step 109.

However, conventional method has the disadvantage of a limited range. The conventional method can not accurately measure the movement speed of mobile unit when the mobile unit moves a low velocity. FIG. 2 shows the measurement results of the prior art method. There are three distinct curves A, B, C respectively representing three mobile units having distinct powers of carrier signal. Obviously, when the three mobile units moves below a specific speed, e.g. 18 km/hr, the curves A, B, C bend down sharply. As such, one correlation coefficient mean value may map two distinct speeds and system can not determine the correct movement speed of the mobile unit.

SUMMARY OF THE INVENTION

The present invention provides a method and system for estimating movement speed of mobile unit in a mobile radio communication system. A wide measuring range and improved low-velocity performance are achieved by using the method of the present invention. The mobile radio communication system accurately measures the movement speed of the mobile unit with low velocity by using the system of the present invention.

First, a receiver of the base station receives a signal from a mobile unit. After being processed by the receiver, the signal becomes a first signal. The present invention obtains a second signal by utilizing a processed value, such as square value of the envelope, of the first signal. Then, the present invention obtains a third signal by multiplying the second signal by a carrier including a carrier frequency. The present invention further calculates a correlation coefficient of the third signal and obtains a Doppler frequency of the correlation coefficient referring to a corresponding relationship between correlation coefficient and Doppler frequency. Last, the present invention estimates the movement speed of the mobile unit according to the Doppler frequency.

The present invention also provides a system for estimating movement speed of mobile unit. The system including a receiving unit, a receiving unit, a calculating unit, and an estimating unit. The receiving unit receives a first signal corresponding to a signal from the mobile unit. The calculating unit calculates an envelope of the first signal and squares the envelope to obtain a second signal. The modulating unit multiplies the second signal by a carrier to obtain a third signal. The carrier includes a carrier frequency between 6 to 80 Hz. The estimating unit estimates the movement speed of the mobile unit according to the third signal.

The estimating unit includes a first unit, a second unit, and a third unit. The first unit calculates a correlation coefficient of the third signal. The second unit obtains a Doppler frequency of the correlation coefficient referring to a corresponding relationship between correlation coefficient and Doppler frequency. The third unit estimates the movement speed of mobile unit according to the Doppler frequency.

DETAILED DESCRIPTION

Figure 1:
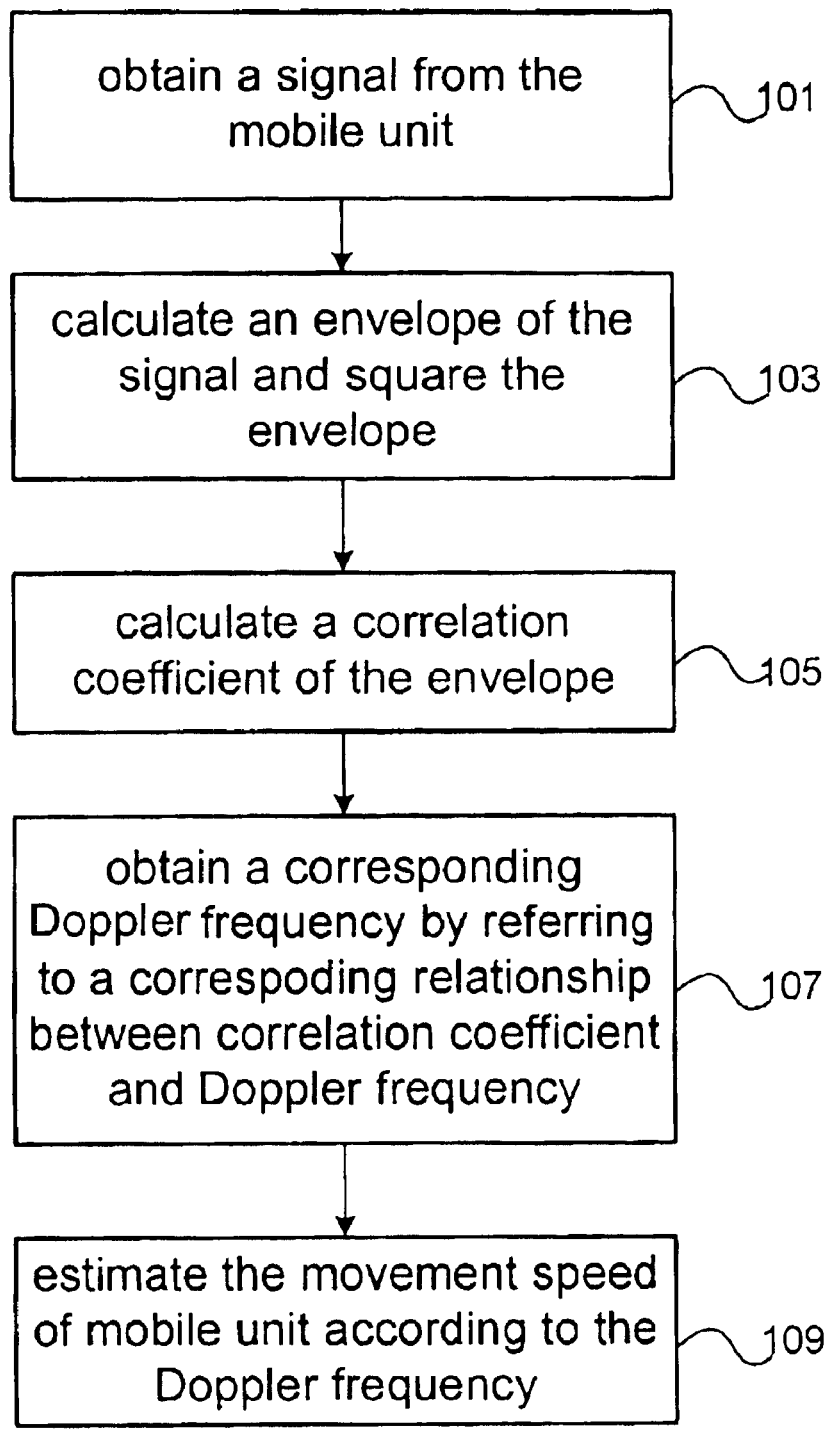
FIG. 1 shows a conventional method for estimating movement speed of mobile unit.
Figure 2:
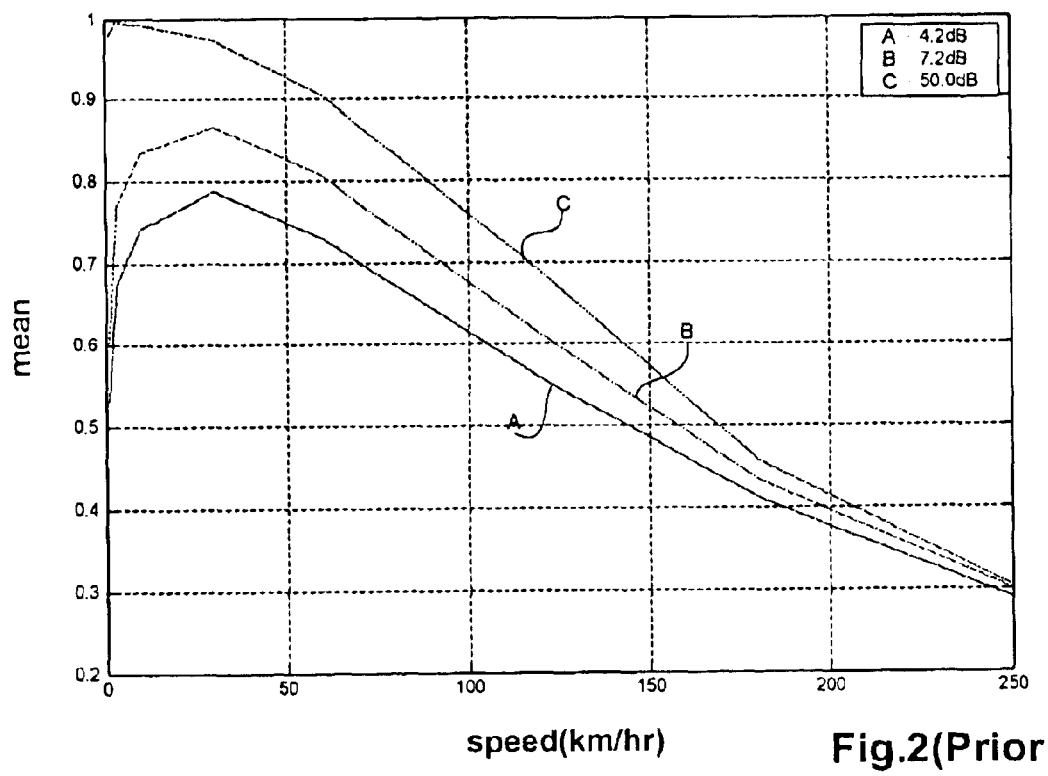
FIG. 2 shows the performance of the prior art.
Figure 3:
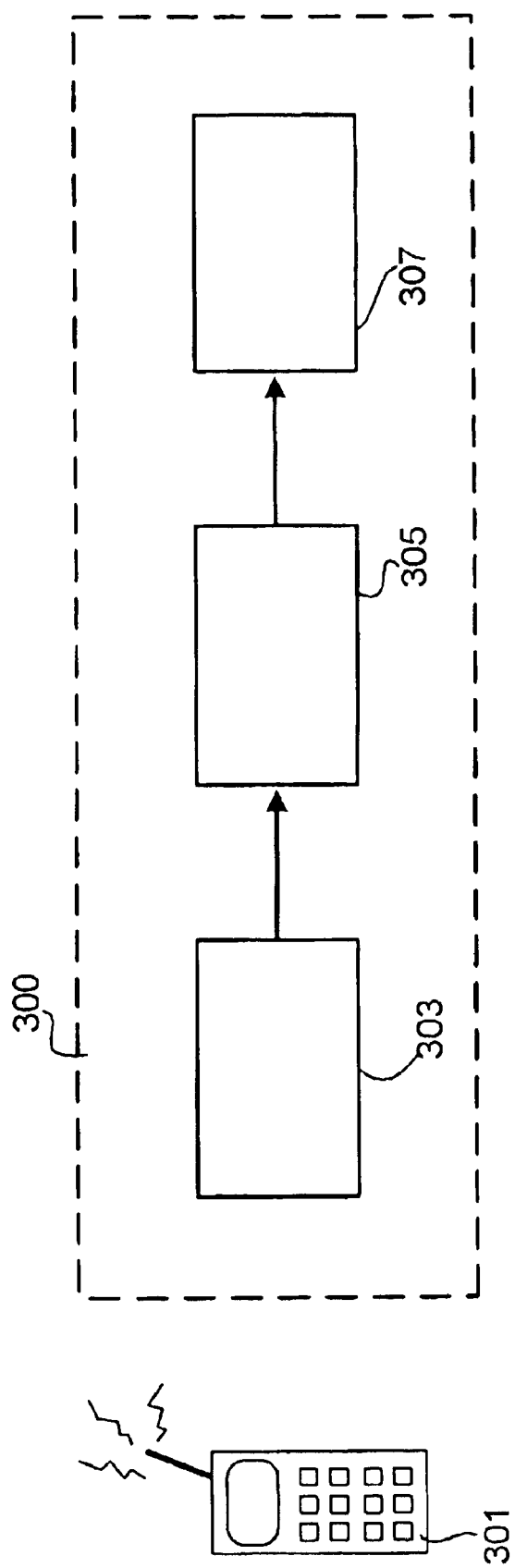
FIG. 3 shows a structure diagram of the mobile radio communication system.

FIG. 3 illustrates a structure diagram of a mobile radio communication system. The structure includes a mobile unit 301 and a receiver 300. The mobile unit 301 transmits a signal to the receiver 300. The receiver 300 includes a pre-processor 303, a system 305 for estimating movement speed of a mobile unit, and a processor 307. The pre-processor processes the signal received from the mobile unit

300. The pre-processor 303 may include an antenna, an amplifier, and a low noise down converter. The system 305 then estimates the movement speed of the mobile unit 301 according to the signal from pre-processor 303. Afterward, The processor 307 implements the following process, e.g. handover, according to the movement speed of the mobile unit 301 estimated by the system 305.

Figure 4:
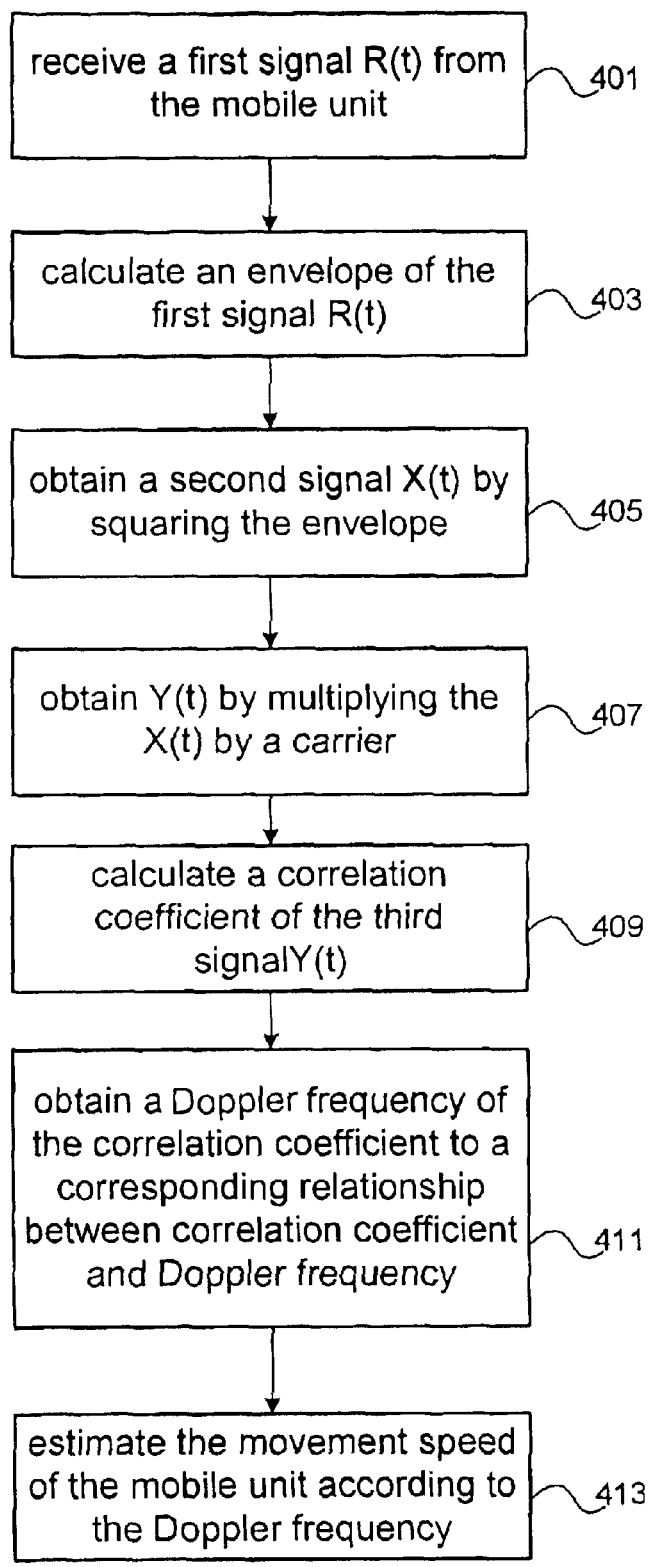
FIG. 4 shows a method for estimating movement speed of mobile unit of the present invention.

FIG. 4 shows a method for estimating movement speed of mobile unit of the present invention. First, the present invention receives a first signal R (t) corresponding to a signal from the mobile unit in step 401. The present invention calculates an envelope of the first signal R (t) in step 403. Then, the present invention obtains a second signal by squaring the envelope in step 405 and obtains a third signal Y (t) by multiplying the second signal by a carrier, e.g. cos ($2\pi f_D$t) in step 407. The Y (t) is obtained by:

$$Y(t) = X(t)\cos(2\pi f_D t)$$

In this invention, the carrier cos ($2\pi f_D$t) includes a carrier frequency $f_D$ between 8 to 60 Hz.

After obtaining the third signal Y (t), the present invention calculates a correlation coefficient of the third signal Y (t) in step 409. And the present invention obtains a Doppler frequency of the correlation coefficient by referring to a corresponding relationship between correlation coefficient and Doppler frequency, e.g. a table of correlation coefficients and Doppler frequencies, in step 411. Then, the present invention estimates the movement speed of the mobile unit according to the Doppler frequency in step 413.

Figure 5:
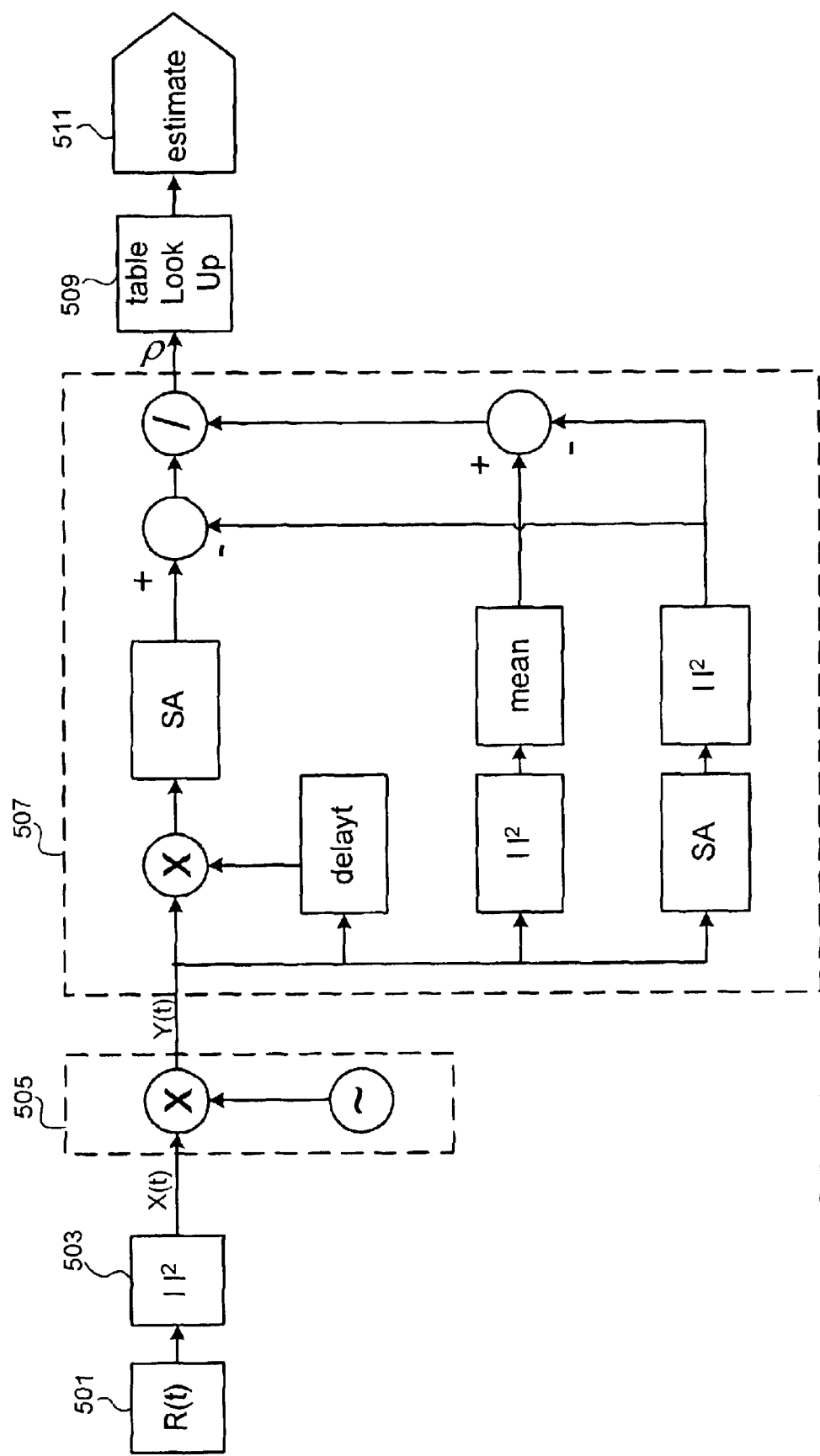
FIG. 5 shows a block diagram of the exemplary embodiment of the present invention.

FIG. 5 shows a block diagram of the exemplary embodiment of the present invention. The present invention receives a first signal R (t) corresponding to a signal from the mobile unit in step 501. Then, the present invention obtains a second signal by squaring an envelope of the first signal R (t) in step 503. The present invention obtains a third signal Y (t) by multiplying the second signal by a carrier, e.g. cos ($2\pi f_D$t) in step 505. A correlation coefficient of the third signal Y (t) is calculated in step 507. The correlation coefficient ρ is obtained by:

$$\rho = \frac{E\{Y(t)Y(t-\tau)\} - |E\{Y(t)\}|^2}{E\{|Y(t)|^2\} - |E\{Y(t)\}|^2}$$

After obtaining the correlation coefficient ρ, the present invention refers to a table of correlation coefficients and Doppler frequencies to obtain a Doppler frequency in step 509. Then, the movement speed of the mobile unit is estimated according to the Doppler frequency in step 511.

Figures 6A, 6B:
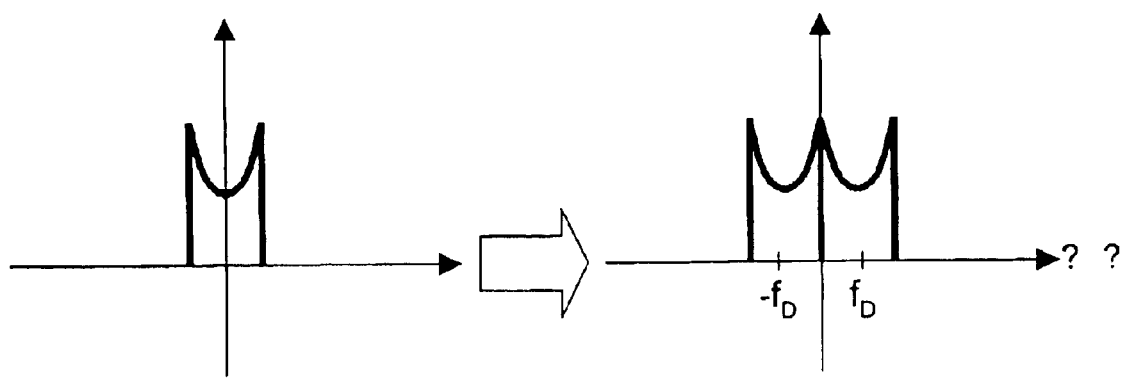
FIGS. 6 (*a*), (*b*) show a spectrum of a first signal and a spectrum of a signal multiplied by a carrier.

The present invention multiplies the signal by a carrier to shift the spectrum for accurately measuring the movement speed of the mobile unit. FIG. 6 (*a*) shows the spectrum of signal R (t). FIG. 6 (*b*) shows the spectrum of a signal which is obtained by multiplying R (t) by a carrier, e.g. cos ($2\pi f_D$t). The carrier frequency of the carrier is $f_D$.

Figure 7:
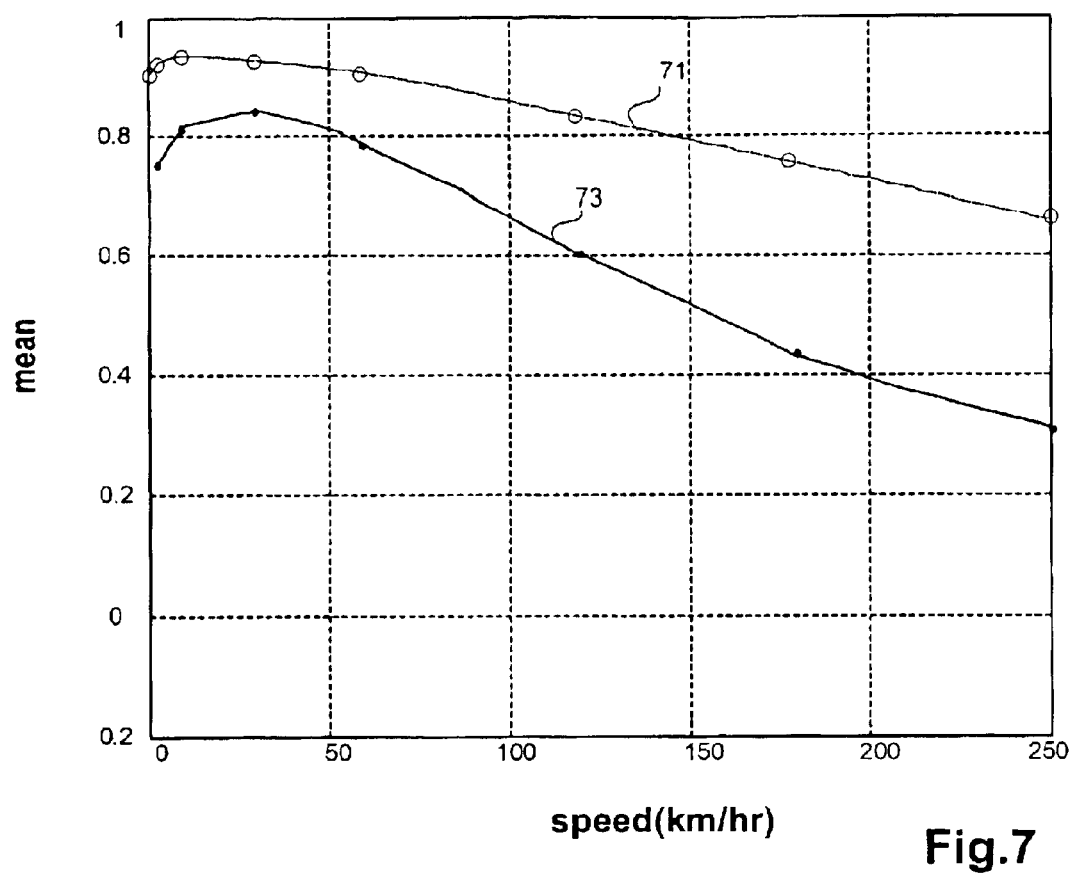
FIG. 7 shows the performances of an exemplary embodiment of the present invention.

Now refer to FIG. 7. FIG. 7 shows the performances of an exemplary embodiment of the present invention. Curve 73 represents the performance of conventional method. Curve 71 represents the performance of an exemplary embodiment of the present invention. Obviously, the bending degree of curve 71 at a low velocity is improved. In the exemplary embodiment, the preferred carrier frequency of the carrier is 15 Hz.

Figure 8:
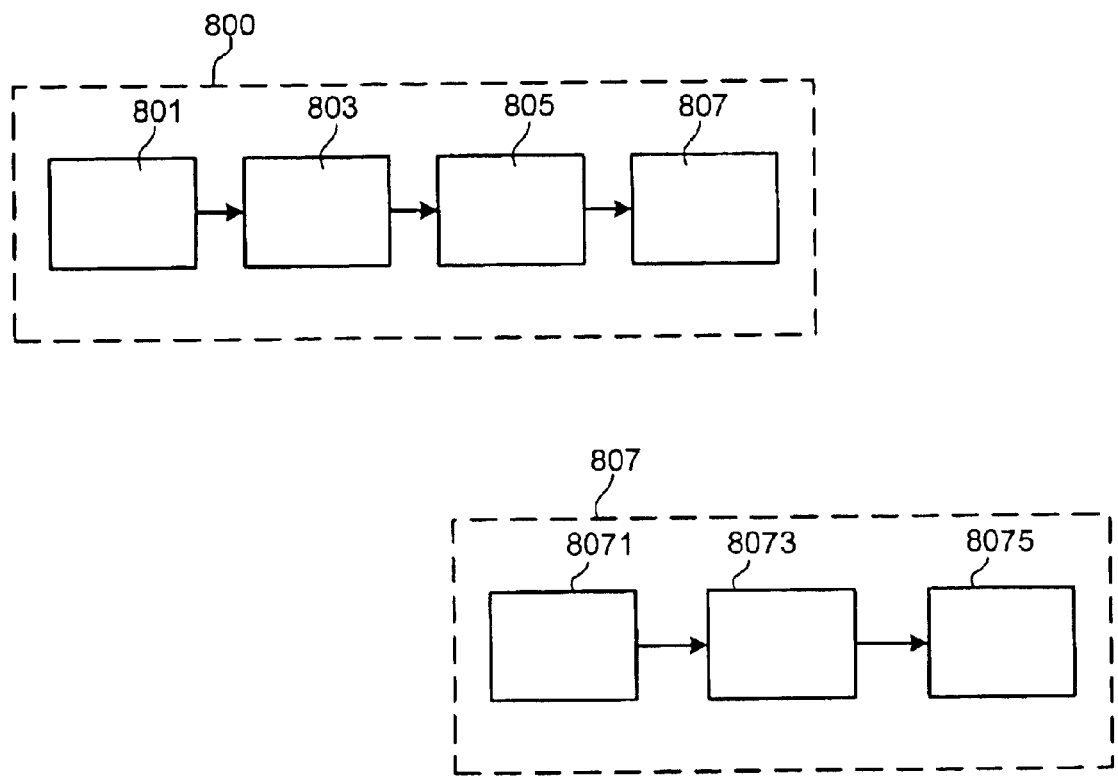
FIG. 8 shows a system for estimating movement speed of mobile unit of the present invention.

In addition, the present invention provides a system for estimating a movement speed of a mobile unit. As shown in FIG. 8, the system 800 includes a receiving unit 801, a calculating unit 803, a modulating unit 805, and an estimating unit 807. The receiving unit 801 receives a first signal corresponding to a signal received from mobile unit. The calculating unit 803 calculates an envelope of the first signal and squares the envelope to obtaining a second signal. The modulating unit 805 multiplies the second signal by a carrier, e.g. cos ($2\pi f_D$t) to obtain a third signal. The carrier includes a carrier frequency between 6 to 80 Hz. The estimating unit 807 estimates the movement speed of mobile unit according to the third signal.

The estimating unit 807 includes a first unit 8071, a second unit 8073, and a third unit 8075. The first unit 8071 calculates a correlation coefficient of the third signal. The second unit 8073 obtains a Doppler frequency of the correlation coefficient referring to a corresponding relationship between correlation coefficient and Doppler frequency, e.g. a table of correlation coefficients and Doppler frequencies. The third unit 8075 estimates the movement speed of mobile unit according to the Doppler frequency.

While this invention has been described with reference to an illustrative embodiment, this embodiment is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as falling within the true scope of the invention.

I claim:

1. A method for estimating a movement speed of a mobile unit in a mobile radio communication system, comprising:

receiving a first signal corresponding to a signal transmitted from said mobile unit;

obtaining a second signal by calculating an envelope of said first signal;

obtaining a third signal by multiplying said second signal by a carrier, said carrier including a carrier frequency;

calculating a correlation coefficient of said third signal;

obtaining a Doppler frequency of said correlation coefficient referring to a corresponding relationship between said correlation coefficient and said Doppler frequency; and estimating said movement speed of said mobile unit according to said Doppler frequency.

2. The method of claim 1, wherein said carrier frequency is between 8 to 60 Hz.

3. The method of claim 1, wherein calculating said envelope of said first signal further comprising squaring said envelope.

4. The method of claim 1, wherein referring to a corresponding relationship between said correlation coefficients and Doppler frequencies is referring to a table of correlation coefficients and Doppler frequencies.

5. A system for estimating a movement speed of a mobile unit, comprising:

a receiving unit for receiving a first signal corresponding to a signal transmitted from said mobile unit;

a calculating unit for calculating an envelope of said first signal to obtaining a second signal;

a modulating unit for multiplying said second signal by a carrier to obtain a third signal, said carrier including a carrier frequency; and an estimating unit for estimating said movement speed of said mobile unit according to said third signal.

6. The system of claim 5, wherein said carrier frequency is between 8 to 60 Hz.

7. The system of claim 5, wherein said calculating unit further squaring said envelope.

8. The system of claim 5, wherein the estimating unit for estimating said movement speed of said mobile unit according to said third signal comprises the following steps:

calculating a correlation coefficient of said third signal;

obtaining a Doppler frequency of said correlation coefficient by referring to a corresponding relationship between said correlation coefficient and said Doppler frequency; and estimating said movement speed of said mobile unit according to said Doppler frequency.

9. The system of claim 8, wherein referring to a corresponding relationship between said correlation coefficient and said Doppler frequency is referring to a table of correlation coefficients and Doppler frequencies.

* * * * *